(12) United States Patent
Chen

(10) Patent No.: US 11,533,646 B2
(45) Date of Patent: Dec. 20, 2022

(54) MEASUREMENT REPORTING BASED ON CURRENT TERMINAL STATE

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/632,761

(22) PCT Filed: Jul. 2, 2018

(86) PCT No.: PCT/CN2018/093981
§ 371 (c)(1),
(2) Date: Jan. 21, 2020

(87) PCT Pub. No.: WO2019/015470
PCT Pub. Date: Jan. 24, 2019

(65) Prior Publication Data
US 2020/0169905 A1 May 28, 2020

(30) Foreign Application Priority Data
Jul. 21, 2017 (CN) .......................... 201710602557.6

(51) Int. Cl.
*H04W 24/10* (2009.01)
*H04W 52/02* (2009.01)
*H04W 72/08* (2009.01)

(52) U.S. Cl.
CPC ....... *H04W 24/10* (2013.01); *H04W 52/0216* (2013.01); *H04W 72/085* (2013.01)

(58) Field of Classification Search
CPC ..... H04W 24/10; H04W 24/02; H04W 36/30; H04W 36/0085; H04W 24/08; H04W 36/32; H04W 72/085; H04W 36/00837; H04W 36/0094; H04W 64/006; H04W 52/365; H04W 8/02
USPC ........................................... 455/422.1, 67.11
See application file for complete search history.

(56) References Cited

U.S. PATENT DOCUMENTS

2009/0247162 A1    10/2009  Yasuoka et al.
2013/0201914 A1*   8/2013   Wang ................. H04W 24/10
                                                370/328
2016/0234726 A1*   8/2016   Nuggehalli ....... H04W 36/0072

FOREIGN PATENT DOCUMENTS

CN    102647766 A    8/2012
CN    102761901 A    10/2012
CN    103052056 A    4/2013
CN    104540239 A    4/2015
(Continued)

OTHER PUBLICATIONS

Chinese Search Report Application No. 201710602557.6; reported on Apr. 15, 2019.
(Continued)

*Primary Examiner* — Philip Sobutka
(74) *Attorney, Agent, or Firm* — von Briesen & Roper, s.c.

(57) ABSTRACT

A measurement reporting method and a device are provided. The measurement reporting method applied to a terminal includes: triggering a measurement reporting in a case that the terminal satisfies a preset measurement reporting event, wherein the preset measurement reporting event is related to current state information of the terminal.

20 Claims, 8 Drawing Sheets

(56) References Cited

FOREIGN PATENT DOCUMENTS

| CN | 105592496 A | 5/2016 |
|---|---|---|
| EP | 2779745 A1 | 9/2014 |
| WO | WO 2013/020517 A1 | 2/2013 |

OTHER PUBLICATIONS

International Search Report & Written Opinion related to Application No. PCT/CN2018/093981; reported on Sep. 27, 2018.
Intel Corporation, "Measurements in NR", 3GPP TSG RAN WG2 Meeting #96, R2-168511, Reno, Nevada, Nov. 14, 2016-Nov. 18, 2016.
European Search Report Application No. 18836029.1; reported on Jun. 24, 2020.
Ericsson; "Measurement framework enhancement for mobility for aerial UEs while airborne"; 3GPP TSG-RAN WG2 #101 bis; Tdoc R2-1805610; Sanya, China Apr. 16, 2018-Apr. 20, 2018.
Samsung, "Discussion on Adaption of Measurement Related Parameters for Different Mobility Scenarios"; 3GPP TSG RAN WG2 NR AH #2; R2-1707325; Qingdao, China, Jun. 27, 2017-Jun. 29, 2017.
Ericsson; "UE speed based measurement report parameter scaling in NR"; 3GPP TSG-RAN WG2 #98-AdHoc; Tdoc R2-1707288; Qingdao, China, Jun. 27, 2017-Jun. 29, 2017 . . . .
"$3^{rd}$ Generation Partnership Project; Technical Specification Group Radio Access Network; Evolved Universal Terrestrial Radio Access (E-UTRA); Radio Resource Control (RRC); Protocol specification (Release 14)", 3GPP Standard; Technical Specification; 3GPP TS 36.331, $3^{rd}$ Generation Partnership Project (3GPP), Mobile Competence Centre; 650, Route Des Lucioles; F-06921 Sophia-Antipolis Cedex; France, vol. RAN WG2, No. V14.3.0, Jul. 13, 2017, pp. 1-745, XP051336663.
European Office Action for related Application No. 18836029.1; reported on Feb. 14, 2022.

\* cited by examiner

MEASUREMENT REPORTING BASED ON CURRENT TERMINAL STATE

CROSS-REFERENCE TO RELATED APPLICATION

This application is a U.S. national phase application of a PCT Application No. PCT/CN2018/093981 filed on Jul. 2, 2018, which claims priority to a Chinese Patent Application No. 201710602557.6, filed in China on Jul. 21, 2017, the disclosure of which is incorporated herein by reference in its entirety.

TECHNICAL FIELD

The present disclosure relates to the field of wireless communication technology, and in particular, relates to a measurement reporting method and a measurement and reporting device.

BACKGROUND

In a Long Term Evolution (LTE) system, a base station transmits information of a measurement configuration to a User Equipment (UE) via a Radio Resource Control (RRC) signaling, and the terminal performs measurement (intra-frequency measurement, inter-frequency measurement, or inter-system measurement) according to content of the information of the measurement configuration, and then triggers reporting of a measurement result to the UE according to a configured measurement reporting event, or reports a measurement result to the base station periodically.

Regardless of a current state of the UE (whether the UE is movable or not, a current moving state of the UE, a state of a network to which the UE currently belongs, and a state of a channel which the UE is currently using), a configuration of triggering a measurement reporting of the terminal is unchanged. There is no difference in configurations for the UE in different states, which is detrimental to saving power for some stationary terminals or some terminals having low-moving speeds.

SUMMARY

The present disclosure provides a measurement reporting method and a device. In the present disclosure, a terminal with information of different states may adopt different configurations of triggering measurement reporting. In a case that the terminal is in a state that does not require frequent measurement reporting, an amount of times of measurement reporting is reduced, so as to achieve a purpose of saving power.

In a first aspect, a measurement reporting method provided by some embodiment of the present disclosure is applied to a terminal and includes: triggering a measurement reporting in a case that the terminal satisfies a preset measurement reporting event, wherein the preset measurement reporting event is related to current state information of the terminal.

In a second aspect, a measurement reporting method provided by some embodiment of the present disclosure is applied to a base station and includes: receiving a measurement reporting of a terminal, wherein the measurement reporting is triggered by the terminal in a case that the terminal satisfies a preset measurement reporting event, wherein the preset measurement reporting event is related to current state information of the terminal.

In a third aspect, some embodiments of the present disclosure provide a terminal, and the terminal includes: a measurement reporting module, configured to trigger a measurement reporting in a case that the terminal satisfies a preset measurement reporting event, wherein the preset measurement reporting event is related to current state information of the terminal.

In a fourth aspect, some embodiments of the present disclosure provide a base station, and the base station includes: a reception module, configured to receive a measurement reporting of a terminal, wherein the measurement reporting is triggered by the terminal in a case that the terminal satisfies a preset measurement reporting event, wherein the preset measurement reporting event is related to current state information of the terminal.

In a fifth aspect, some embodiments of the present disclosure provide a terminal, and the terminal includes: a storage and a processor, wherein a computer program executable by the processor is stored in the storage, and in a case that the computer program is executed by the processor, the processor implements steps of the measurement reporting method applied to a terminal described as above.

In a sixth aspect, some embodiments of the present disclosure provide a base station, the base station includes: a storage and a processor, wherein a computer program executable by the processor is stored in the storage, and in a case that the computer program is executed by the processor, the processor implements steps of the measurement reporting method applied to a base station described as above.

In a seventh aspect, some embodiments of the present disclosure provide a computer readable storage medium storing therein a computer program, and in a case that the computer program is executed by a processor, the processor implements steps of the measurement reporting method applied to a terminal described as above.

In an eighth aspect, some embodiments of the present disclosure provide a computer readable storage medium storing therein a computer program, and in a case that the computer program is executed by a processor, the processor implements steps of the measurement reporting method applied to a base station described as above.

In this way, in some embodiments of the present disclosure, the terminal triggers a measurement reporting according to state information of the terminal, which may implement that information of different states corresponds to different configurations of triggering the measurement reporting; in a case that the terminal is in a state that does not require frequent measurement and reporting, an amount of times of the measurement reporting is reduced, so as to achieve a purpose of saving power.

BRIEF DESCRIPTION OF THE DRAWINGS

In order to more clearly illustrate technical solutions in some embodiments of the present disclosure, drawings used in the description of some embodiments of the present disclosure will be briefly introduced below. Obviously, the drawings in the following description are only some embodiments of the present disclosure. Based on these drawings, other drawings may be obtained by a person of ordinary skills in the art without any creative effort.

FIG. 6 is second structural am illustrating a terminal according to some embodiments of the present disclosure.

DETAILED DESCRIPTION

Figure 1:
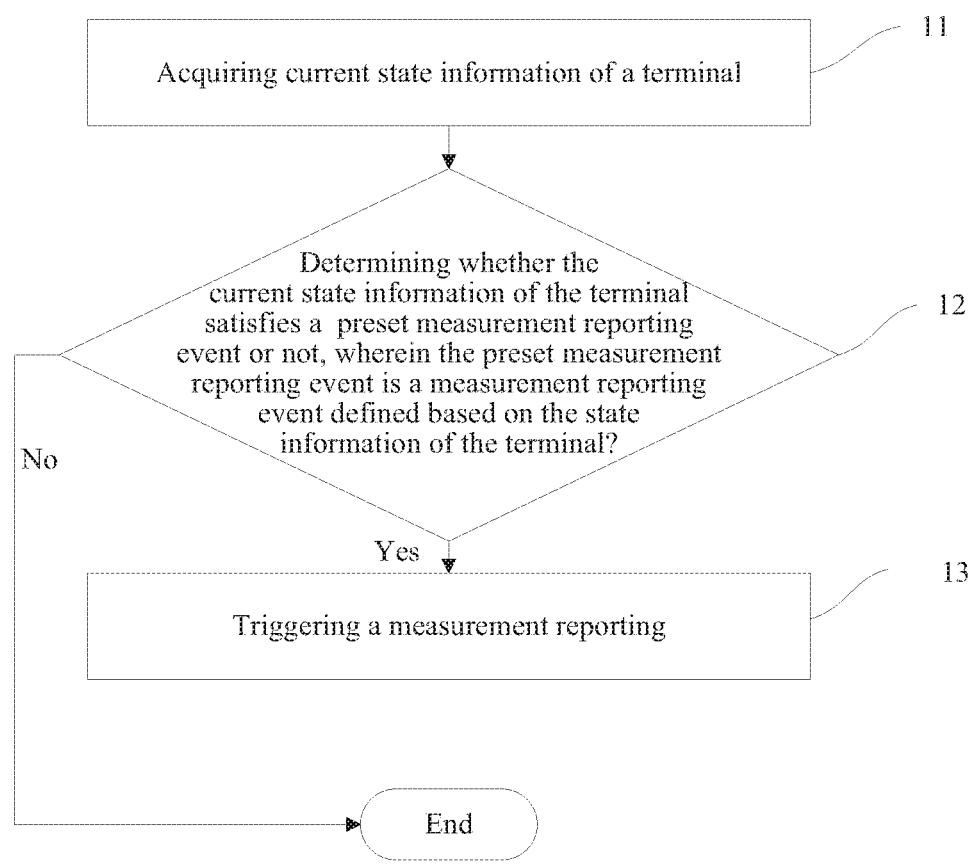
FIG. 1 is a first flow chart illustrating a measurement reporting method according to some embodiments of the present disclosure.

In order to make objectives, technical solutions and advantages of the present disclosure clearer, the technical solutions of some embodiments of the present disclosure will be clearly and completely described below with reference to the drawings of some embodiments of the present disclosure. Apparently, the described embodiments are some, rather than all of the embodiments of the present disclosure. Based on the described embodiments of the present disclosure, all other embodiments derived by a person of ordinary skills in the art shall fall within the scope of the present disclosure.

The measurement reporting method provided by some embodiments of the present disclosure is applied to a terminal and includes: triggering a measurement reporting in a case that the terminal satisfies a preset measurement reporting event, wherein the preset measurement reporting event is related to current state information of the terminal.

In some embodiments of the present disclosure, the terminal may trigger a measurement and reporting according to state information of the terminal, and may realize that information of different states corresponds to different configurations of triggering the measurement reporting. In a case that the terminal is in a state that does not require frequent measurement and reporting, an amount of times of measurement and reporting is reduced, so as to achieve a purpose of saving power.

The terminal in some embodiments of the present disclosure may be a wireless terminal or a wired terminal, and the wireless terminal may be a device that provides voice and/or other service data connectivity to a user, a handheld device having a wireless connecting function, or other processing devices connected to a wireless modem. The wireless terminal may communicate with one or more core networks via a Radio Access Network (RAN), and the wireless terminal may be a mobile terminal, such as a mobile phone (or referred to as "cellular" phone) and a computer having a mobile terminal, for example, a portable mobile device, a pocket mobile device, a handheld mobile device, a computer built-in mobile device or an in-vehicle mobile device that exchanges language and/or data with a wireless access network. For example, a Personal Communication Service (PCS) telephone, a cordless telephone, a Session Initiation Protocol (SIP) telephone, a Wireless Local Loop (WLL) station, a Personal Digital Assistant (PDA) or the like. The wireless terminal may also be referred to as a system, a Subscriber Unit, a Subscriber Station, a Mobile Station, a Mobile, a Remote Station, a Remote Terminal, and an Access Terminal, a User Terminal, a User Agent, a User Device or a User Equipment, and is not limited herein.

In some embodiments of the present disclosure, the current state information of the terminal may include at least one of: a type of the terminal, whether the terminal is movable or not, a highest moving speed of the terminal, a current moving state of the terminal, a current service state of the terminal, a state of a network where the terminal is currently located, and a state of a channel that the terminal is currently using.

The type of the terminal may mean that the terminal is a mobile terminal, an Internet of Things terminal, or an immobile terminal, etc. Since different types of terminals have different mobility, for example, some Internet of Things terminals cannot move frequently, and therefore do not need to frequently perform a reselection procedure or a handover procedure, the terminal autonomously determines an occasion to trigger the measurement and reporting according to a current state, so as to reduce an amount of times of the measurement reporting and save power consumption of the terminal.

Whether the terminal is movable or not is determined by the type of the terminal or the environment in which the terminal is located. The highest moving speed of the terminal is also related to the type of the terminal.

The current moving state of the terminal may include: a stationary state, a low-speed moving state or a high-speed moving state, etc. It may be understood that, in a case that the terminal is in the stationary state or the low-speed moving state, since the reselection procedure or the handover procedure is not required to perform frequently, a configuration of triggering the measurement reporting different from that for a terminal in a high-speed moving state may be used to avoid frequent measurement and reporting performed by this type of terminal, and to save power consumption of the terminal. In a case that the terminal is in the high-speed moving state, the reselection procedure or the handover procedure may be required to perform, and therefore, the terminal may perform a normal measurement and reporting, i.e., perform a measurement reporting triggered by a base station, to ensure that the terminal may perform the reselection procedure or the handover procedure normally. In some embodiments of the present disclosure, to determine whether a terminal is in a moving state or not, it generally requires that, after the terminal is in the moving state for a preset time duration, the terminal is determined to be in the moving state, so as to prevent misjudgment. In some embodiments of the present disclosure, the low-speed moving state refers to a moving state where a moving speed is lower than or equal to a first preset threshold, the high-speed moving state refers to that a moving state where a moving speed is not lower than or equal to a second preset threshold, and the first preset threshold and the second preset threshold may be specified as needed. For example, the first preset threshold may be 30 km/h or 60 km/h, and the second preset threshold may be 120 km/h.

The current service state of the terminal means whether the terminal has a call service or a data service, etc. or not. For example, in a case that a terminal performs a certain data service, the terminal may autonomously determine to trigger the measurement and reporting at an appropriate occasion according to a current state, in order to ensure the normal transmission of the data service and avoid frequent measurement and reporting of the terminal that affects the normal transmission of data services.

The state of the network where the terminal is currently located or the state of the channel that the terminal is currently using may include: a signal quality of a network side where the terminal is currently located, etc. It may be understood that in a case that the terminal is in a network having a better signal quality, the reselection procedure or the handover procedure is usually not required to perform, whereas in a case that the terminal is in a network having a poor signal quality, the reselection procedure or the handover procedure may be required to perform. Therefore, the terminal may autonomously determine to trigger the measurement and reporting at an appropriate occasion according to a current state.

In some embodiments of the present disclosure, to determine the current state information of the terminal, it generally requires that, after the terminal is in a certain state for a preset time duration, the terminal is determined to be in the state, so as to prevent misjudgment.

Similarly, in some embodiments of the present disclosure, to determine a change in the current state information of the terminal, it generally requires that, after a state of the terminal is changed and the terminal is in the changed state for a preset time duration, the terminal is determined to change the state of the terminal or the terminal is in the changed state; or only after the terminal reaches a preset number of times of state changes, the terminal is determined to change the state of the terminal or the terminal is in the changed state, so as to prevent misjudgment.

In some embodiments of the present disclosure, the current state information of the terminal may be information stored in the terminal in advance, such as the type of the terminal, whether the terminal is movable or not, the highest moving speed of the terminal and other inherent information of the terminal. In addition, the current state information of the terminal may also be detected by sensors built into the terminal, for example, whether the terminal is in the moving state or not, the moving speed of the terminal, and a signal quality of a network where the terminal is located, etc.

In some embodiments of the present disclosure, the preset measurement reporting event includes at least one of following types: the preset measurement reporting event being a measurement reporting event defined by the terminal based on state information of the terminal; or the preset measurement reporting event being a measurement reporting event, corresponding to the current state information of the terminal, selected by the terminal from predefined measurement reporting events, wherein information of different states corresponds to different measurement reporting events; or the preset measurement reporting event being a measurement reporting event selected by the terminal from predefined measurement reporting events, wherein a threshold corresponding to the current state information of the terminal is configured for the selected measurement reporting event, and different state information corresponds to different thresholds; or the preset measurement reporting event being a measurement reporting event selected by the terminal from predefined measurement reporting events, wherein an offset amount corresponding to the current state information of the terminal is configured for the selected measurement reporting event, and information of different states corresponds to different offset amounts; or the preset measurement reporting event being a measurement reporting event configured by a base station, wherein the terminal configures an offset amount corresponding to the current state information of the terminal for the measurement reporting event configured by the base station, and information of different states corresponds to different offset amounts.

The predefined measurement reporting event in the above embodiment refers to a measurement reporting event specified in a related protocol, that is, a measurement reporting event used in a case that the base station performs a related configuration of measurement and reporting.

The measurement reporting event specified in the related protocol refers to any one of measurement reporting events A1 to A6, B1, B2, C1, C2, W1 to W3, V1 and V2 that are defined in a LTE Technical Specification TS 36.331 or a Fifth Generation (5G) mobile communication system (New Radio, NR) protocol TS 38.331.

In a case that the above preset measurement reporting event is a measurement reporting event defined by the terminal according to the state information of the terminal, following two cases may be included: 1) the terminal defines, based on the state information, the measurement reporting event for performing the measurement and reporting; and 2) although the base station configures the measurement reporting event, the terminal still performs the measurement reporting according to the measurement reporting event defined based on the state information.

The above-mentioned preset reporting events are all related to the current state information of the terminal. Therefore, a rule of determining the measurement and reporting is more in line with actual needs of a terminal in different states.

In a case that the preset measurement reporting event is a measurement reporting event defined by the terminal based on state information of the terminal, optionally, the measurement reporting event defined by the terminal may include: an event that a Reference Signal Received Power value of a currently measured cell is less than or equal to a Reference Signal Received Power threshold value stored by the terminal, and/or, a Reference Signal Received Quality value of a currently measured cell is less than or equal to a Reference Signal Received Quality threshold value stored by the terminal.

Optionally, the Reference Signal Received Power threshold value stored by the terminal and/or the Reference Signal Received Quality threshold value stored by the terminal is configured by the base station for the terminal or is pre-specified in a protocol.

In some embodiments of the present disclosure, prior to triggering the measurement reporting in a case that the terminal satisfies the preset measurement reporting event, the method further includes: determining whether measurement is currently required to be performed or not; and acquiring a measurement result in a case that the measurement is required to be performed.

In other embodiments, determining whether the measurement is currently required to be performed or not, includes: determining whether the measurement is currently required to be performed or not according to the current state information of the terminal, that is, determining, by the terminal autonomously, a measurement occasion according to current state information of the terminal.

In other embodiments, determining whether the measurement is currently required to be performed or not, includes: determining whether the measurement is currently required to be performed or not according to the current state information of the terminal and based on a condition about whether information of a measurement configuration transmitted by a base station is received or not. That is, the measurement occasion is determined by combining the occasion of triggering the measurement reporting by the base station and the current state information of the terminal.

In other embodiments, determining whether the measurement is currently required to be performed or not, includes: determining whether the measurement is currently required to be performed or not according to the condition about whether information of a measurement configuration transmitted by a base station is received.

In some embodiments of the present disclosure, acquiring the measurement result may include: estimating the measurement result according to the current state information of the terminal, so that there is no need to perform a part or all of actual measurements, so that a part or all of the measurement may be saved, but the measurement result may be acquired, to achieve a purpose of saving power. Especially in a case that the terminal uses a high-performance receiver, the estimated measurement results are more accurate.

After the measurement result is estimated, the measurement reporting may be performed according to the configured measurement reporting event or periodically, or the terminal performs the measurement reporting according to the measurement reporting event related to the state information of the terminal in the present disclosure.

In some embodiments of the present disclosure, prior to triggering the measurement reporting in a case that the preset measurement reporting event is satisfied, the method further includes: receiving enable information transmitted by a base station, wherein the enable information is configured to instruct the terminal to enable or disable the measurement reporting related to the current state information of the terminal.

The measurement reporting related to the current state information of the terminal is: a measurement reporting by the terminal in a case that satisfies the preset measurement reporting event related to the current state information of the terminal is satisfied.

In a case that the enable information is the enable, the enable information is configured to instruct the terminal to enable the measurement reporting related to the current state information of the terminal. In a case that the enable information is the disable, the enable information is configured to instruct the terminal to disable the measurement reporting related to the current state information of the terminal. At this time, the terminal may perform the measurement reporting according to a conventional configuration of triggering a measurement and reporting, that is, a measurement reporting triggered by a base station. In the present embodiment, the base station controls the terminal to trigger the enable or the disable of the measurement reporting related to the current state information of the terminal, which makes a management performed by the base station more convenient.

The measurement reporting method in some embodiments of the present disclosure may further include: starting a preset timer (an allowed timer), allowing the terminal to perform the measurement reporting related to the current state of the terminal during a timing duration of the preset timer, and prohibiting the terminal from performing the measurement reporting related to the current state of the terminal after the preset timer expires.

After the preset timer expires, the terminal is only allowed to perform the measurement reporting according to the conventional configuration of triggering the measurement reporting, and the terminal is not allowed to perform the measurement reporting according to the configuration of triggering the measurement reporting related to the current state of the terminal in some embodiments of the present disclosure.

Optionally, the measurement reporting method in some embodiments of the present disclosure may further include: starting a preset timer (prohibit timer), prohibiting the terminal from performing the measurement reporting related to the current state of the terminal during a timing duration of the preset timer, and allowing the terminal to perform the measurement reporting related to the current state of the terminal after the preset timer expires.

Before the preset timer expires, the terminal is only allowed to perform the measurement reporting according to the conventional configuration of triggering the measurement and reporting, and the terminal is not allowed to perform the measurement reporting according to the configuration of triggering the measurement reporting related to the current state of the terminal in some embodiments of the present disclosure.

Optionally, prior to starting a preset timer, the measurement reporting method further includes: receiving configuration information transmitted by a base station, wherein the configuration information is configured to instruct the terminal to start the preset timer in a case that the terminal may trigger the measurement reporting related to the current state of the terminal.

The measurement reporting method in some embodiments of the present disclosure may further include: receiving a measurement reporting mode configured by a base station, wherein different measurement reporting modes correspond to different measurement configurations.

The terminal performs the measurement reporting according to a measurement reporting mode configured by the base station.

The measurement reporting mode may include: a Low required RRM measurement mode (or a low required idle mode measurement (LM for short)) or a Power Saving mode (PS for short), or a conventional measurement reporting mode.

Referring to FIG. 1, FIG. 1 is a first flow chart illustrating a measurement reporting method according to some embodiments of the present disclosure, and the method includes the following steps 11-13.

Step 11: acquiring current state information of a terminal.

Step 12: determining whether the current state information of the terminal satisfies a preset measurement reporting event or not, wherein the preset measurement reporting event is a measurement reporting event defined based on the state information of the terminal. If the current state information of the terminal satisfies a preset measurement reporting event, then proceeding to Step 13; If the current state information of the terminal does not satisfy a preset measurement reporting event, terminating the flow.

Step 13: triggering a measurement reporting.

In some embodiments of the present disclosure, a measurement reporting event defined based on the state information of the terminal is used as a preset measurement reporting event, to determine whether a measurement reporting is required to be triggered or not, so that the occasion of the measurement reporting is more in line with requirements of terminals in different states.

Figure 2:
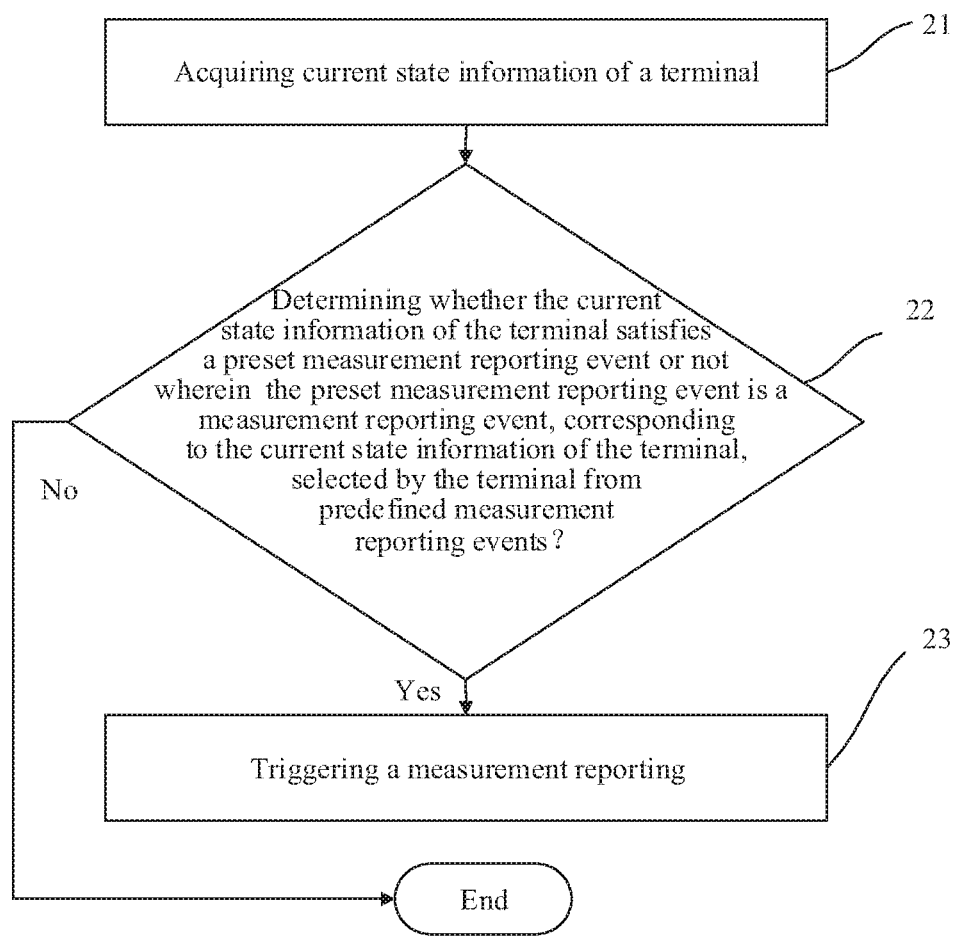
FIG. 2 is a second flow chart illustrating a measurement reporting method according to some embodiments of the present disclosure.

Referring to FIG. 2, FIG. 2 is a second flow chart illustrating a measurement reporting method according to some embodiments of the present disclosure, and the method includes the following steps 21-23.

Step 21: acquiring current state information of a terminal.

Step 22: determining whether the current state information of the terminal satisfies a preset measurement reporting event or not, wherein the preset measurement reporting event is a measurement reporting event, corresponding to the current state information of the terminal, selected by the terminal from predefined measurement reporting events. If the current state information of the terminal satisfies the preset measurement reporting event, then proceeding to Step 23; if the current state information of the terminal does not satisfy the preset measurement reporting event, terminating the flow.

Step 23: triggering a measurement reporting.

In some embodiments of the present disclosure, the predefined measurement reporting event is used as a preset measurement reporting event to determine whether a measurement reporting is required to be triggered. There is no need to define a measurement reporting event, and the implementation is simple.

Figure 3:
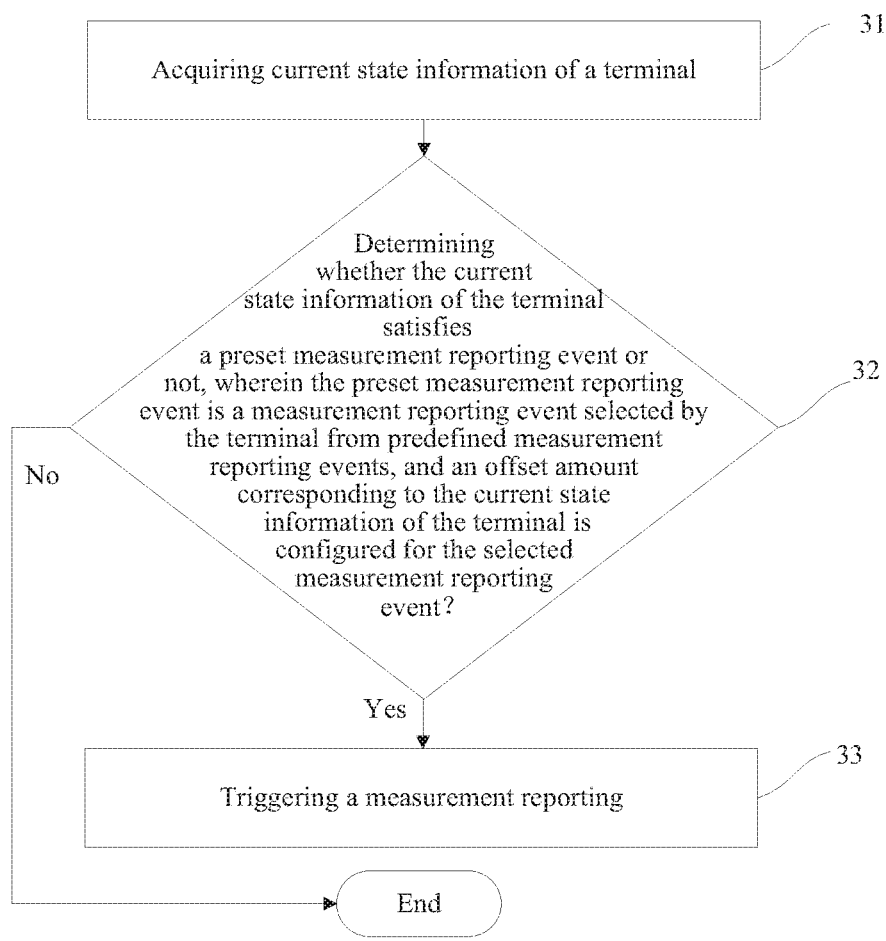
FIG. 3 is a third flow chart illustrating a measurement reporting method according to some embodiments of the present disclosure.

Referring to FIG. 3, FIG. 3 is a third flow chart illustrating a measurement reporting method according to some embodiments of the present disclosure, and the method includes the following steps 31-33.

Step 31: acquiring current state information of a terminal.

Step 32: determining whether the current state information of the terminal satisfies a preset measurement reporting event or not, wherein the preset measurement reporting event is a measurement reporting event selected by the terminal from predefined measurement reporting events, and an offset amount corresponding to the current state information of the terminal is configured for the selected measurement reporting event. Information of different states corresponds to different offset amounts. If the current state information of the terminal satisfies the preset measurement reporting event, then proceeding to Step 33; if the current state information of the terminal does not satisfy the preset measurement reporting event, terminating the flow.

Step 33: triggering a measurement reporting.

In some embodiments of the present disclosure, the terminal configures different offset amounts for different pieces of state information, so that an occasion of the measurement reporting is more in line with requirements of terminals in different states.

Figure 4:
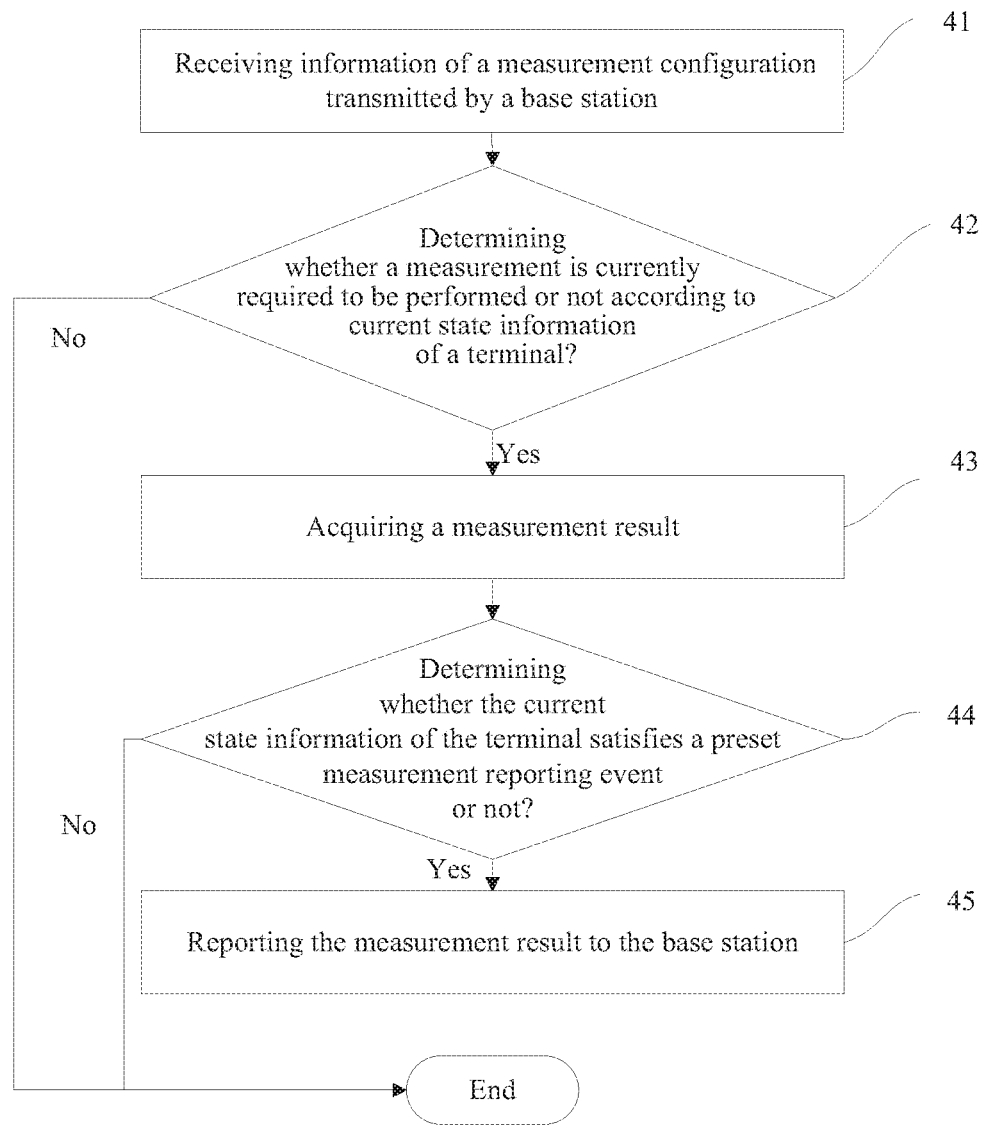
FIG. 4 is a fourth flow chart illustrating a measurement reporting method according to some embodiments of the present disclosure.

Referring to FIG. 4, FIG. 4 is a fourth flow chart illustrating a measurement reporting method according to some embodiments of the present disclosure, and the method includes the following steps 41-45.

Step 41: receiving information of a measurement configuration transmitted by a base station.

Step 42: determining whether a measurement is currently required to be performed or not according to current state information of a terminal. If the measurement is currently required to be performed, then proceeding to Step 43; if the measurement is currently not required to be performed, terminating the flow.

Step 43: acquiring a measurement result.

Step 44: determining whether the current state information of the terminal satisfies a preset measurement reporting event or not. If the current state information of the terminal satisfies the preset measurement reporting event, then proceeding to Step 45; if the current state information of the terminal does not satisfy the preset measurement reporting event, terminating the flow.

Step 45: reporting the measurement result to the base station.

In some embodiments of the present disclosure, both determination of the measurement and determination of the measurement reporting are performed according to the current state information of the terminal.

Figure 5:
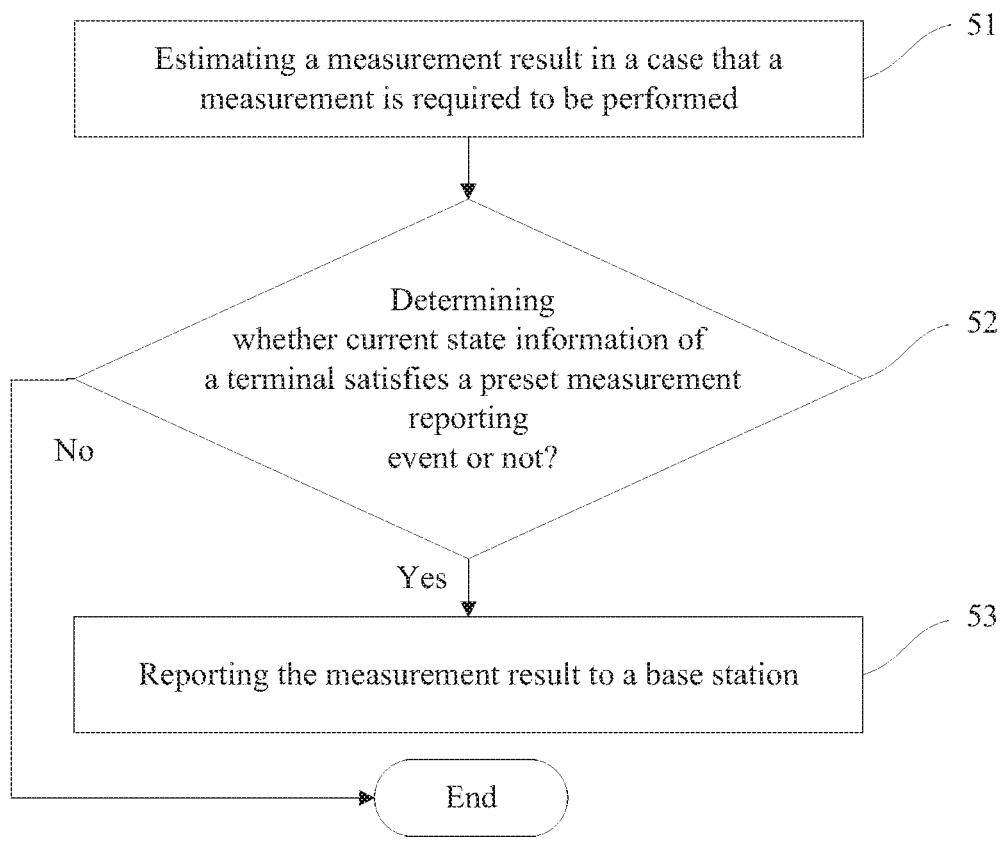
FIG. 5 is a fifth flow chart illustrating a measurement reporting method according to some embodiments of the present disclosure.

Referring to FIG. 5, FIG. 5 is a fifth flow chart illustrating a measurement reporting method according to some embodiments of the present disclosure, and the method includes the following steps.

Step 51: estimating a measurement result in a case that a measurement s required to be performed.

Step 52: determining whether current state information of a terminal satisfies a preset measurement reporting event. If the current state information of the terminal satisfies the preset measurement reporting event, then proceeding to Step 53; If the current state information of the terminal does not satisfy the preset measurement reporting event, terminating the flow.

Step 53: reporting the measurement result to a base station.

In some embodiments of the present disclosure, the terminal may estimate the measurement result without an actual measurement, and is particularly suitable for a terminal having a high-performance receiver.

Based on the same inventive concept, the present disclosure also provides a terminal, and the terminal includes: a measurement reporting module, configured to trigger a measurement reporting in a case that the terminal satisfies a preset measurement reporting event, wherein the preset measurement reporting event is related to current state information of the terminal.

Optionally, the current state information of the terminal may include at least one of: a type of the terminal, whether the terminal is movable or not, a highest moving speed of the terminal, a current moving state of the terminal, a current service state of the terminal, a state of a network where the terminal is currently located, and a state of a channel that the terminal is currently using.

Optionally, the preset measurement reporting event includes at least one of the following types: the preset measurement reporting event being a measurement reporting event defined by the terminal based on state information of the terminal; or the preset measurement reporting event being a measurement reporting event, corresponding to the current state information of the terminal, selected by the terminal from predefined measurement reporting events, wherein information of different states corresponds to different measurement reporting events; or the preset measurement reporting event being a measurement reporting event selected by the terminal from predefined measurement reporting events, wherein a threshold corresponding to the current state information of the terminal is configured for the selected measurement reporting event, and information of different states corresponds to different thresholds; or the preset measurement reporting event being a measurement reporting event selected by the terminal from predefined measurement reporting events, wherein an offset amount corresponding to the current state information of the terminal is configured for the selected measurement reporting event, and information of different states corresponds to different offset amounts; or the preset measurement reporting event being a measurement reporting event configured by a base station, wherein the terminal adds an offset amount corresponding to the current state information of the terminal to the measurement reporting event configured by the base station, wherein information of different states corresponds to different offset amounts.

Optionally, the measurement reporting event defined by the terminal, includes: a Reference Signal Received Power value of a currently measured cell being less than or equal to a Reference Signal Received Power threshold value stored by the terminal; and/or, a Reference Signal Received Quality value of a currently measured cell being less than or equal to a Reference Signal Received Quality threshold value stored by the terminal.

Optionally, the Reference Signal Received Power threshold value stored by the terminal and/or the Reference Signal Received Quality threshold value stored by the terminal are configured by the base station for the terminal or are predefined.

Optionally, the terminal may further include: a measurement determination module, configured to determine whether a measurement is currently required to be performed or not; and a measurement result acquiring module, configured to acquire a measurement result in a case that the measurement is required to be performed.

Optionally, the measurement determination module is configured to determine whether the measurement is currently required to be performed or not according to the current state information of the terminal; or the measurement determination module is configured to determine whether the measurement is currently required to be performed or not according to the current state information of the terminal and whether information of a measurement configuration transmitted by a base station is received or not; or the measurement determination module is configured to determine whether the measurement is currently required to be performed or not according to whether information of a measurement configuration transmitted by a base station is received or not.

Optionally, the measurement result acquiring module is configured to estimate a measurement result according to the current state information of the terminal.

Optionally, the terminal may further include: a first reception module, configured to receive enable information transmitted by a base station, wherein the enable information is configured to instruct the measurement reporting module to enable or disable a function of triggering the measurement reporting in a case that the preset measurement reporting event is satisfied.

Optionally, the terminal may further include: a timer module, configured to start a preset timer, allow the measurement reporting module to perform the measurement reporting related to the current state of the terminal during a timing duration of the preset timer, and prohibit the measurement reporting module from performing the measurement reporting related to the current state of the terminal after the preset timer expires; or start a preset timer, prohibit the measurement reporting module from performing the measurement reporting related to the current state of the terminal, and allow the measurement reporting module to perform the measurement reporting related to the current state of the terminal after the preset timer expires.

Optionally, the terminal may further include: a second reception module, configured to receive configuration information transmitted by a base station, wherein the configuration information is configured to instruct the measurement reporting module to start the preset timer in a case that the measurement reporting module is capable of triggering the measurement reporting.

Optionally, the terminal may further include: a third reception module, configured to receive a measurement reporting mode configured by a base station, wherein different measurement reporting modes correspond to different measurement configurations.

In some embodiments, the present disclosure further provides a measurement reporting method, the measurement reporting method is applied to a base station and includes: receiving measurement reporting of a terminal, wherein the measurement reporting is triggered by the terminal in a case that the terminal satisfies a preset measurement reporting event, and the preset measurement reporting event is related to current state information of the terminal.

Optionally, the measurement reporting method further includes: transmitting enable information to the terminal, wherein the enable information is configured to instruct the terminal to enable or disable a function of measurement reporting related to the current state information of the terminal.

Optionally, the measurement reporting method further includes: transmitting configuration information to a terminal, wherein the configuration information is configured to instruct, in a case that the terminal is capable of triggering the measurement reporting related to the current state information of the terminal, the terminal to start a preset tinier, allow the terminal to perform the measurement reporting related to the current state information of the terminal during a timing duration of the preset timer, prohibit the terminal from performing the measurement reporting related to the current state information of the terminal after the preset timer expires; or, prohibit the terminal from performing the measurement reporting related to the current state information of the terminal during a timing duration of the preset timer, and allow the terminal to perform the measurement reporting related to the current state information of the terminal after the preset timer expires.

Optionally, the measurement reporting method further includes: configuring a measurement reporting mode for the terminal, wherein different measurement reporting modes correspond to different measurement configurations.

In some embodiments, the present disclosure further provides a base station, the base station includes: a reception module, configured to receive measurement reporting from a terminal, wherein the measurement reporting is triggered by the terminal in a case that the terminal satisfies a preset measurement reporting event, and the preset measurement reporting event is related to current state information of the terminal.

Optionally, the base station may further include: a first transmission module, configured to transmit enable information to the terminal, wherein the enable information is configured to instruct the terminal to enable or disable a function of measurement reporting related to the current state information of the terminal.

Optionally, the base station may further include: a second transmission module, configured to transmit configuration information to the terminal, wherein the configuration information is configured to instruct, in a case that the terminal is capable of triggering the measurement reporting related to the current state information of the terminal, the terminal to start a preset timer, allow the terminal to perform the measurement reporting related to the current state information of the terminal during a timing duration of the preset timer, prohibit the terminal from performing the measurement reporting related to the current state information of the terminal after the preset timer expires; or, prohibit the terminal from performing the measurement reporting related to the current state information of the terminal during a timing duration of the preset timer, and allow the terminal to perform the measurement reporting related to the current state information of the terminal after the preset timer expires.

Optionally, the base station may further include: a third transmission module, configured to configure a measurement reporting mode for the terminal, wherein different measurement reporting modes correspond to different measurement configurations.

Some embodiments of the present disclosure further provide a terminal. The terminal includes a storage and a processor, wherein a computer program executable by the processor is stored in the storage, and in a case that the computer program is executed by the processor, the processor implements steps of the measurement reporting method applied at a terminal side described as above.

Some embodiments of the present disclosure further provide a base station. The base station includes a storage and a processor, wherein a computer program executable by the processor is stored in the storage, and in a case that the computer program is executed by the processor, the processor implements steps of the measurement reporting method applied at a base station side described as above.

Some embodiments of the present disclosure further provide a computer readable storage medium storing therein a computer program, wherein when the computer program is executed by a processor, the processor implements steps of the measurement reporting method applied at a terminal side described as above, and the same technical effect may be achieved. To avoid redundancy, a repeated description is omitted herein. The computer readable storage medium may be either volatile or non-volatile, such as a Read-Only Memory (ROM), a Random Access Memory (RAM), a magnetic disk or an optical disk, etc.

Some embodiments of the present disclosure further provide a computer readable storage medium storing therein a computer program, wherein when the computer program is executed by a processor, the processor implements steps of the measurement reporting method applied at a base station side described as above, and the same technical effect may be achieved. To avoid redundancy, a repeated description is omitted herein. The above computer readable storage medium may be either volatile or non-volatile, such as a Read-Only Memory (ROM), a Random Access Memory (RAM), a magnetic disk or an optical disk, etc.

Figure 6:
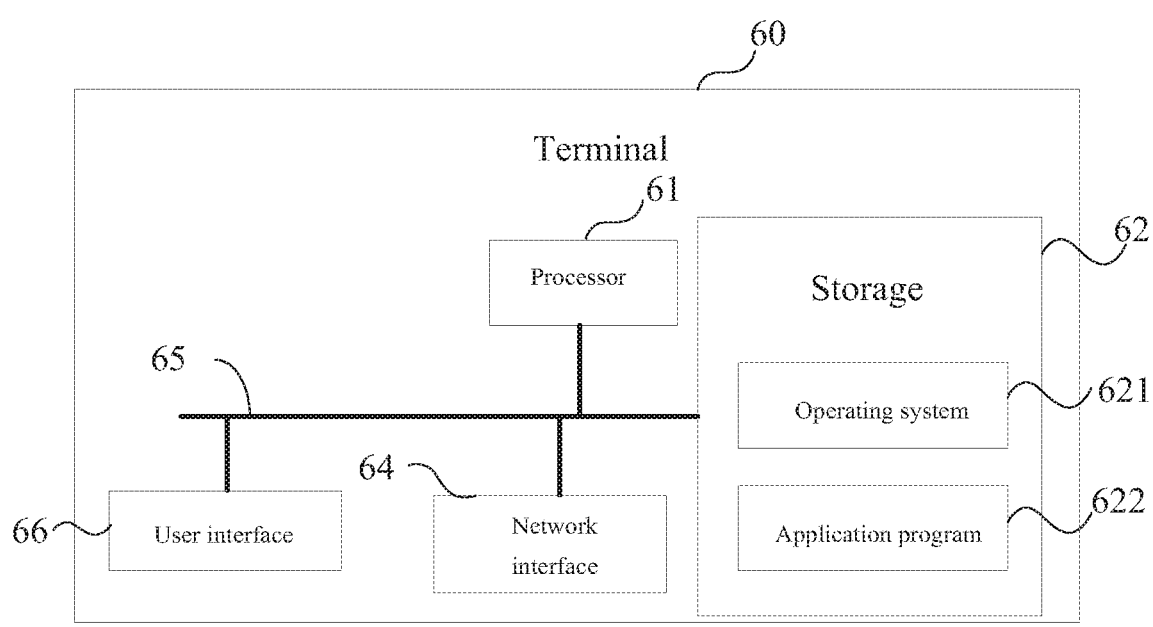
FIG. 6 is first structural diagram illustrating a terminal according to some embodiments of the present disclosure.

Referring to FIG. 6, some embodiments of the present disclosure provide a terminal 60. The terminal 60 shown in FIG. 6 includes: at least one processor 61, a storage 62, at least one network interface 64 and other user interfaces 63. The various components in the terminal 60 are coupled together by a bus system 65. It will be appreciated that the bus system 65 is configured to enable connection communication between these components. The bus system 65 includes a power bus, a control bus, a data bus and a status signal bus. However, for clarity of description, various buses are labeled as the bus system 65 in FIG. 6.

The user interface 63 may include a display, a keyboard, or a pointing device (e.g., a mouse), a trackball, a touchpad, or a touch screen, etc.

It is to be understood that the storage 62 in some embodiments of the present disclosure may be either a volatile storage or a non-volatile storage, or may include both a volatile storage and a non-volatile storage. The non-volatile storage may be a Read-Only Memory (ROM), a Programmable ROM (PROM), an Erasable PROM (EPROM), or an Electrically EPROM (EEPROM) or a flash memory. The volatile storage may be a Random Access Memory (RAM) that acts as an external cache. By way of example and without limitation, many forms of RAMs are available, such as a Static RAM (SRAM), a Dynamic RAM (DRAM), a Synchronous DRAM (SDRAM), a Double DataRate SDRAM (DDRSDRAM), an Enhanced SDRAM (ESDRAM), a Synchlink DRAM (SLDRAM) and a Direct Rambus RAM (DRRAM). The storage 62 for storing the systems and methods described in the present disclosure is intended to include, but is not limited to, these and any other suitable types of storages.

In some embodiments, the storage 62 stores following elements, executable modules or data structures, or a subset thereof, or an extended set thereof: an operating system 621 and an application program 622.

The operating system 621 includes various system programs, such as a framework layer, a core library layer, a driver layer, and the like, for implementing various basic services and processing hardware-based tasks. The application program 622 includes various application programs, such as a Media Player, a Browser, and the like, for implementing various application services, and a program implementing the methods of the embodiments of the present disclosure may be included in the application program 622.

The terminal 60 further includes: a computer program stored in the storage 62 and executable by the processor 61, specifically, which may be a computer program in the application program 622. In a case that the computer program is executed by the processor 61, the processor 61 implements the following step: triggering a measurement reporting in a case that the terminal satisfies a preset measurement reporting event, wherein the preset measurement reporting event is related to current state information of the terminal.

The above method disclosed in some embodiments of the present disclosure may be applied to the processor 61 or implemented by the processor 61. The processor 61 may be an integrated circuit chip having a processing capability of signals. During an implementation process, steps of the method may be realized by hardware in a form of integrated logical circuits in the processor 61, or by software in a form of instructions. The processor 61 may be a general purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. Various methods, steps, and logical block diagrams disclosed in some embodiments of the present disclosure may be implemented or carried out. The general purpose processor may be a microprocessor, any conventional processor, etc. The steps of the methods disclosed with reference to the embodiments of the present disclosure may be directly embodied as hardware in the form of a coding processor, or performed by the hardware in the coding processor and software modules. The software modules may reside in well-established storage medium in the art, such as a RAM, a flash memory, a ROM, a PROM or an EEPROM, a register. The storage medium resides in the storage 62. The processor 61 reads information from the storage 62 and performs the steps of the methods in combination with hardware of the processor 61.

It may be understood that the modules or units of the terminal described above or the modules or units of the base station described above may be implemented by hardware, software, firmware, middleware, a microcode or a combination thereof. For hardware implementation, processing units may be implemented in one or more Application Specific Integrated Circuits (ASIC), a Digital Signal Processor (DSP), a DSP Device (DSPD), a Programmable Logic Device (PLD), a Field Programmable Gate Array (FPGA), a general purpose processor, a controller, a microcontroller, a microprocessor, other electronic unit configured to perform the function described in the present application or a combination thereof.

For software implementation, techniques described in the present disclosure may be implemented by modules (e.g., processes, functions, etc.) that perform the functions described in the present disclosure. A software code may be stored in the storage and executed by the processor. The storage may be implemented within the processor or external to the processor.

Optionally, the current state information of the terminal may include at least one of a type of the terminal, whether the terminal is movable or not, a highest moving speed of the terminal, a current moving state of the terminal, a current service state of the terminal, a state of a network where the terminal is currently located, and a state of a channel that the terminal is currently using.

Optionally, the preset measurement reporting event includes at least one of the following types: the preset measurement reporting event being a measurement reporting event defined by the terminal based on state information of the terminal; or the preset measurement reporting event being a measurement reporting event, corresponding to the current state information of the terminal, selected by the terminal from predefined measurement reporting events, wherein information of different states corresponds to different measurement reporting events; or the preset measurement reporting event being a measurement reporting event selected by the terminal from predefined measurement reporting events, wherein a threshold corresponding to the current state information of the terminal is configured for the selected measurement reporting event, and information of different states corresponds to different thresholds; or the preset measurement reporting event being a measurement reporting event selected by the terminal from predefined measurement reporting events, wherein an offset amount corresponding to the current state information of the terminal is configured for the selected measurement reporting event, and information of different states corresponds to different offset amounts; or the preset measurement reporting event being a measurement reporting event configured by a base station, wherein the terminal adds an offset amount corresponding to the current state information of the terminal to the measurement reporting event configured by the base station, and information of different states corresponds to different offset amounts.

Optionally, the measurement reporting event defined by the terminal, includes: a Reference Signal Received Power value of a currently measured cell being less than or equal to a Reference Signal Received Power threshold value stored by the terminal, and/or, a Reference Signal Received Quality value of a currently measured cell being less than or equal to a Reference Signal Received Quality threshold value stored by the terminal.

Optionally, the Reference Signal Received Power threshold value stored by the terminal and/or the Reference Signal Received Quality threshold value stored by the terminal are configured by the base station for the terminal or are predefined.

Optionally, as another embodiment, in a case that the computer program is executed by the processor 61, the processor 61 may further implement the following step: determining whether the measurement is currently required to be performed or not; acquiring a measurement result in a case that the measurement is required to be performed.

Optionally, in a case that the computer program is executed by the processor 61, the processor 61 may further implement the following step: determining whether the measurement is currently required to be performed or not according to the current state information of the terminal; or determining whether the measurement is currently required to be performed or not according to the current state information of the terminal and whether information of a measurement configuration transmitted by a base station is received or not; or determining whether the measurement is currently required to be performed or not according to whether information of a measurement configuration transmitted by a base station is received or not.

Optionally, in a case that the computer program is executed by the processor 61, the processor 61 may further implement the following step: estimating the measurement result according to the current state information of the terminal.

Optionally, in a case that the computer program is executed by the processor 61, the processor 61 may further implement the following step: receiving enable information transmitted by a base station, wherein the enable information is configured to instruct the terminal to enable or disable the measurement reporting related to the current state information of the terminal.

Optionally, in a case that the computer program is executed by the processor 61, the processor 61 may further implement the following steps: starting a preset timer, allowing the terminal to perform the measurement reporting related to the current state information of the terminal during a timing duration of the preset timer, prohibiting the terminal from performing the measurement reporting related to the current state information of the terminal after the preset timer expires; or, starting a preset timer, prohibiting the terminal from performing the measurement reporting related to the current state information of the terminal during a timing duration of the preset timer, allowing the terminal to perform the measurement reporting related to the current state information of the terminal after the preset timer expires.

Optionally, in a case that the computer program is executed by the processor 61, the processor 61 may further implement the following step: receiving configuration information transmitted by a base station, wherein the configuration information is configured to instruct the terminal to start the preset timer in a case that the terminal is capable of triggering the measurement reporting related to the current state information of the terminal.

Optionally, in a case that the computer program is executed by the processor 61, the processor 61 may further implement the following step: receiving a measurement reporting mode configured by a base station, wherein different measurement reporting modes correspond to different measurement configurations.

The terminal 60 may implement various processes implemented by the terminal in the foregoing embodiments and details are not described herein again to avoid repetition.

The terminal 60 in some embodiments of the present disclosure may trigger a measurement reporting according to state information of the terminal, and may realize different configurations of triggering the measurement reporting corresponding to different pieces of state information; in a case that the terminal is in a state that does not require frequent measurement and reporting, an amount of times of measurement reporting is reduced, so as to achieve a purpose of saving power.

Figure 7:
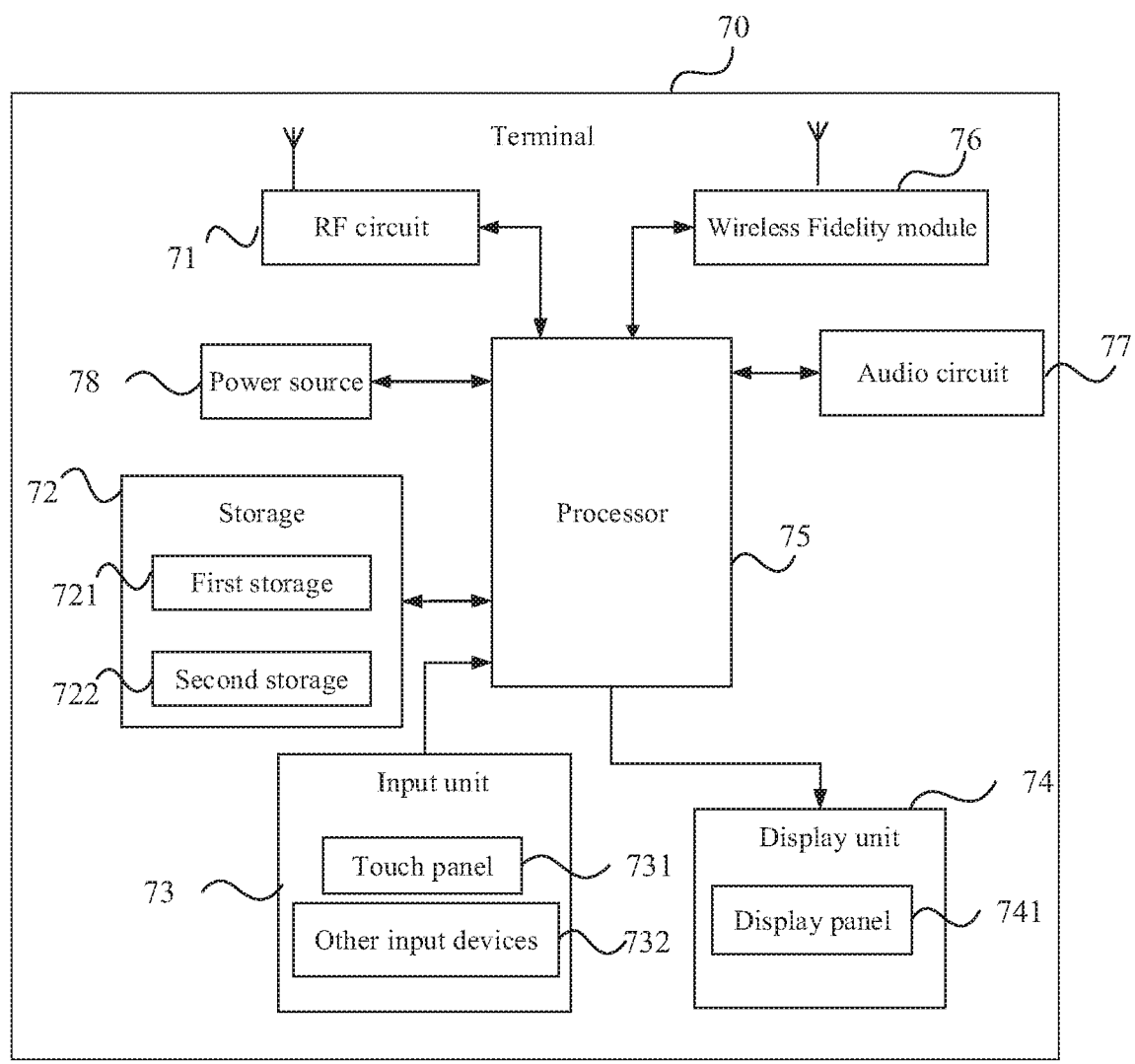

Referring to FIG. 7, the present disclosure provides a terminal 70. Specifically, the terminal 70 in FIG. 7 may be a mobile phone, a tablet computer, a Personal Digital Assistant (PDA), or a car computer, etc.

The terminal 70 in FIG. 7 includes a Radio Frequency (RF) circuit 71, a storage 72, an input unit 73, a display unit 74, a processor 75, a Wireless Fidelity (WIFI) module 76, an audio circuit 77, and a power source 78.

The input unit 73 may be configured to receive numeric information or character information inputted by a user and generate a signal input related to settings of a user and related to a function control of the terminal 70.

Specifically, in some embodiments of the present disclosure, the input unit 73 may include a touch panel 731. The touch panel 731, also referred to as a touch screen, may collect the user's touch operations thereon or nearby (such as the user's operation on the touch panel 731 using any suitable object or accessory such as a finger or a stylus), and drives corresponding connection devices according to a preset program. Optionally, the touch panel 731 may include two parts, namely a touch detection device and a touch controller. The touch detection device detects a touch orientation of the user, and detects a signal generated by the touch operation, and transmits the signal to the touch controller; the touch controller receives touch information from the touch detection device, converts the touch information into a coordinate of a touch point, transmits the coordinate to the processor 75, and may receive and execute a command from the processor 75. In addition, the touch panel 731 may be implemented in various types such as a resistive type, a capacitive type, an infrared type, and a surface-acoustic-wave type, etc. in addition to the touch panel 731, the input unit 73 may further include other input devices 732. The other input devices 732 may include, but are not limited to, one or more of a physical keyboard, a function button (such as a volume control button, a switch button, etc.), a trackball, a mouse, and a joystick, etc.

The display unit 74 may be configured to display information inputted by the user or information provided to the user as well as various menu interfaces of the terminal 70. The display unit 74 may include the display panel 741. Optionally, the display panel 741 may be configured to be a form of an LCD, an Organic Light-Emitting Diode (OLED) or the like.

It should be noted that the touch panel 731 may cover the display panel 741 to form a touch display screen, and in a case that the touch display screen detects a touch operation thereon or nearby, the touch operation is transmitted to the processor 75 to determine the type of the touch event, then the processor 75 provides a corresponding visual output on the touch display screen based on the type of the touch event.

The touch display screen includes an application program interface display area and a common control display area. An arrangement of the application program interface display area and the common control display area is not limited, and the arrangement of the two display areas may be any arrangement capable of distinguishing the two display areas, such as an up-down arrangement, a left-right arrangement, and the like. The application program interface display area may be used to display the interface of the application program. Each interface may include at least one interface element such as an application's icon and/or a widget desktop control. The application program interface display area may also be an empty interface that does not include any content. The common control display area is used to display controls with a high usage rate, such as a setting button, an interface number, a scroll bar, a phone book icon, and the like.

In some embodiments of the present disclosure, by invoking a software program and/or module in a first storage 721 and/or data in a second storage 722, in a case that the computer program is executed by the processor 75, the processor 75 implements the following step: triggering a measurement reporting in a case that the terminal satisfies a preset measurement reporting event, wherein the preset measurement reporting event is related to current state information of the terminal.

Optionally, the current state information of the terminal may include at least one of: a type of the terminal, whether the terminal is movable or not, a highest moving speed of the terminal, a current moving state of the terminal, a current service state of the terminal, a state of a network where the terminal is currently located, and a state of a channel that the terminal is currently using.

Optionally, the preset measurement reporting event includes at least one of following types: the preset measurement reporting event being a measurement reporting event defined by the terminal based on state information of the terminal; or the preset measurement reporting event being a measurement reporting event, corresponding to the current state information of the terminal, selected by the terminal from predefined measurement reporting events, wherein information of different states corresponds to different measurement reporting events; or the preset measurement reporting event being a measurement reporting event selected by the terminal from predefined measurement reporting events, wherein a threshold corresponding to the current state information of the terminal is configured for the selected measurement reporting event, and information of different states corresponds to different thresholds; or the preset measurement reporting event being a measurement reporting event selected by the terminal from predefined measurement reporting events, wherein an offset amount corresponding to the current state information of the terminal is configured for the selected measurement reporting event, and information of different states corresponds to different offset amounts; or the preset measurement reporting event being a measurement reporting event configured by a base station, wherein the terminal adds an offset amount corresponding to the current state information of the terminal to the measurement reporting event configured by the base station, and information of different states corresponds to different offset amounts.

Optionally, the measurement reporting event defined by the terminal, includes: a Reference Signal Received Power value of a currently measured cell being less than or equal to a Reference Signal Received Power threshold value stored by the terminal, and/or, a Reference Signal Received Quality value of a currently measured cell being less than or equal to a Reference Signal Received Quality threshold value stored by the terminal.

Optionally, the Reference Signal Received Power threshold value stored by the terminal and/or the Reference Signal Received Quality threshold value stored by the terminal are configured by the base station for the terminal or are predefined.

Optionally, in a case that the computer program is executed by the processor 75, the processor 75 may further implement the following step: determining whether the measurement is currently required to be performed or not; acquiring a measurement result in a case that the measurement is required to be performed.

Optionally, in a case that the computer program is executed by the processor 75, the processor 75 may further implement the following step: determining, according to the current state information of the terminal, whether the measurement is currently required to be performed or not; or determining, according to the current state information of the terminal and whether information of a measurement configuration transmitted by a base station is received or not, whether the measurement is currently required to be performed or not; or determining, according to whether information of a measurement configuration transmitted by a base station is received or not, whether the measurement is currently required to be performed or not.

Optionally, in a case that the computer program is executed by the processor 75, the processor 75 may further implement the following step: estimating a measurement result according to the current state information of the terminal.

Optionally, in a case that the computer program is executed by the processor 75, the processor 75 may further implement the following step: receiving enable information transmitted by a base station, wherein the enable information is configured to instruct the terminal to enable or disable the measurement reporting related to the current state information of the terminal.

Optionally, in a case that the computer program is executed by the processor 75, the processor 75 may further implement the following steps: starting a preset timer, allowing the terminal to perform the measurement reporting related to the current state information of the terminal during a timing duration of the preset timer, prohibiting the terminal from performing the measurement reporting related to the current state information of the terminal after the preset timer expires; or starting a preset timer, prohibiting the terminal from performing the measurement reporting related to the current state information of the terminal during a timing duration of the preset timer, allowing the terminal to perform the measurement reporting related to the current state information of the terminal after the preset tinier expires.

Optionally, in a case that the computer program is executed by the processor 75, the processor 75 may further implement the following step: receiving configuration information transmitted by a base station, wherein the configuration information is configured to instruct the terminal to start the preset timer in a case that the terminal is capable of triggering the measurement reporting related to the current state information of the terminal.

Optionally, in a case that the computer program is executed by the processor 75, the processor 75 may further implement the following step: receiving a measurement reporting mode configured by a base station, wherein different measurement reporting modes correspond to different measurement configurations.

The terminal 70 may implement various processes implemented by the terminal in the foregoing embodiments and details are not described herein again to avoid repetition.

The terminal 70 in some embodiments of the present disclosure may trigger a measurement and reporting according to state information of the terminal 70, and may realize different configurations of triggering the measurement reporting corresponding to different pieces of state information; in a case that the terminal is in a state that does not require frequent measurement reporting, an amount of times of measurement reporting is reduced, so as to achieve the purpose of saving power.

Figure 8:
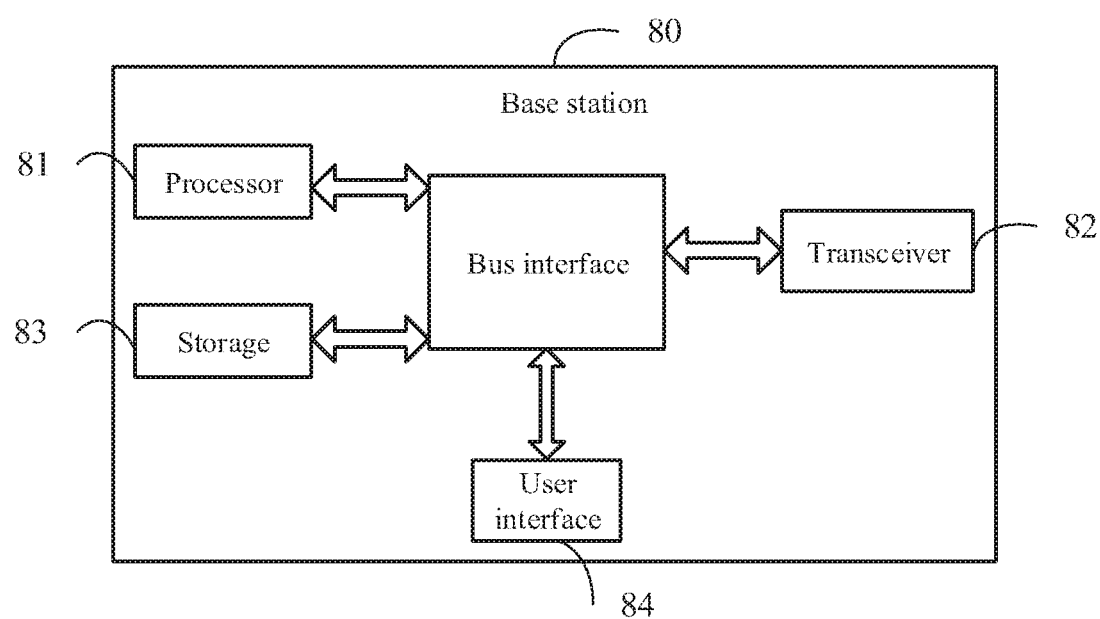
FIG. 8 is a structural diagram illustrating a base station according to some embodiments of the present disclosure.

Referring to FIG. 8, FIG. 8 is a structural diagram illustrating a base station according to some embodiments of the present disclosure. The base station may implement details of the configuration method of measurement reporting at a base station side in the foregoing embodiments, and the same technical effect may be achieved. As shown in FIG. 8, the base station 80 includes: a processor 81, a transceiver 82, a storage 83, a user interface 84 and a bus interface.

In some embodiments of the present disclosure, the base station 80 further includes: a computer program stored in the storage 83 and executable by the processor 81. In a case that the computer program is executed by the processor 81, the processor 81 implements the following step: receiving a measurement reporting from a terminal, wherein the measurement reporting is triggered in a case that the terminal satisfies a preset measurement reporting event, and the preset measurement reporting event is related to current state information of the terminal.

In FIG. 8, a bus architecture may include any number of interconnected buses and bridges. Various circuits, specifically, one or more processors represented by the processor 81 and a storage represented by the storage 83, are linked together. The bus architecture may also link various other circuits such as peripheral devices, voltage regulators and power management circuits, which are well known in the art, and therefore a further description is omitted herein. The bus interface provides interfaces. The transceiver 82 may be a plurality of elements, that is, includes a transmitter and a receiver, for providing units configured to communicate with various other apparatuses over a transmission medium. For different user equipments, the user interface 84 may also be an interface capable of externally/internally connecting the required devices including, but not limited to, a keypad, a display, a speaker, a microphone, a joystick, and the like.

The processor 801 is responsible for managing the bus architecture and general processing, and the storage 83 may store data used by the processor 801 when performing operations.

Optionally, in a case that the computer program is executed by the processor 81, the processor 81 may further implement the following steps: transmitting enable information to the terminal, wherein the enable information is configured to instruct the terminal to enable or disable a function of measurement reporting related to the current state information of the terminal.

Optionally, in a case that the computer program is executed by the processor 81, the processor 81 may further implement the following steps: transmitting configuration information to the terminal, wherein the configuration information is configured to instruct, in a case that the terminal is capable of triggering the measurement reporting related to the current state information of the terminal, the terminal to start a preset timer, allow the terminal to perform the measurement reporting related to the current state information of the terminal during a timing duration of the preset timer, prohibit the terminal from performing the measurement reporting related to the current state information of the terminal after the preset timer expires; or, prohibit the terminal from performing the measurement reporting related to the current state information of the terminal during a timing duration of the preset timer, and allow the terminal to perform the measurement reporting related to the current state information of the terminal after the preset timer expires.

Optionally, in a case that the computer program is executed by the processor 81, the processor 81 may further implement the following step: configuring a measurement reporting mode for the terminal, wherein different measurement reporting modes correspond to different measurement configurations.

The base station according to some embodiments of the present disclosure may configure some pieces of configuration information of the measurement reporting for the terminal, and cooperate with the terminal to complete an optimized measurement reporting procedure.

A person skilled in the art may be aware that, exemplary units and algorithm steps described in connection with the embodiments disclosed herein may be implemented by electronic hardware or a combination of computer software and electronic hardware, such as a circuit. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for ease of description and conciseness, a detailed working process of the foregoing system, apparatus, and unit, may be obtained by referring to a corresponding process in the foregoing method embodiments, and details are not described herein again.

In the embodiments provided in the present application, it should be understood that the disclosed device and method may be implemented in other manners. For example, the described device embodiment is merely exemplary. For example, the unit division is merely a logical function division and may be other division in actual implementations. For example, a plurality of units or components may be combined or integrated into another system, or some features may be ignored or not performed. In addition, a mutual coupling or a direct coupling or a communication connection shown or discussed may be an indirect coupling or a communication connection through some interfaces, devices or units, and may be in an electrical, mechanical or other form.

Units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, various functional units in various embodiments of the present disclosure may be integrated into one processing unit, or each of the units may exist alone physically, or two or more units may be integrated into one unit.

If a function is implemented in form of a software functional unit and sold or used as an independent product, the software functional unit may be stored in a computer readable storage medium. Based on such an understanding, essential part of the present disclosure or the part contributing to the prior art of the technical solutions of the present disclosure, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present disclosure. The foregoing storage medium includes any medium that may store a program code, such as a Universal Serial Bus (USB) flash drive, a removable hard disk, an ROM, an RAM, a magnetic disk, or an optical disc, or the like.

The aforementioned implementations are merely specific implementations of the present disclosure, but the scope of the present disclosure is by no means limited thereto. Any modifications or substitutions that would easily occurred to those skilled in the art, without departing from the technical scope of the present disclosure, should be encompassed in the scope of the present disclosure. Therefore, the scope of the present disclosure is to be determined by the scope of the claims.

What is claimed is:

1. A measurement reporting method, applied to a terminal and comprising:
    triggering a measurement reporting in a case that the terminal satisfies a preset measurement reporting event, wherein the preset measurement reporting event is related to current state information of the terminal,
    wherein the current state information of the terminal comprises a highest moving speed of the terminal
    wherein the highest moving speed of the terminal is related to the type of the terminal, and is inherent information of the terminal;
    wherein
    the preset measurement reporting event being a measurement reporting event selected by the terminal from predefined measurement reporting events, wherein an offset amount corresponding to the current state information of the terminal is configured for the selected measurement reporting event, and information of different states corresponds to different offset amounts.

2. The measurement reporting method according to claim 1, wherein, the measurement reporting event defined by the terminal, comprises:
    a Reference Signal Received Power value of a currently measured cell being less than or equal to a Reference Signal Received Power threshold value stored by the terminal, and/or,
    a Reference Signal Received Quality value of a currently measured cell being less than or equal to a Reference Signal Received Quality threshold value stored by the terminal.

3. The measurement reporting method according to claim 2, wherein the Reference Signal Received Power threshold value stored by the terminal and/or the Reference Signal Received Quality threshold value stored by the terminal are configured by a base station for the terminal or are predefined.

4. The measurement reporting method according to claim 1, wherein, prior to triggering the measurement reporting in a case that the terminal satisfies the preset measurement reporting event, the method further comprises:
    determining whether a measurement is currently required to be performed or not; and
    acquiring a measurement result in a case that the measurement is required to be performed.

5. The measurement reporting method according to claim 4, wherein, determining whether the measurement is currently required to perform or not, comprises:
    determining, according to the current state information of the terminal, whether the measurement is currently required to be performed or not; or
    determining, according to the current state information of the terminal and whether information of a measurement configuration transmitted by the base station is received or not, whether the measurement is currently required to be performed or not; or
    determining, according to whether information of a measurement configuration transmitted by a base station is received or not, whether the measurement is currently required to be performed or not.

6. The measurement reporting method according to claim 4, wherein, acquiring the measurement result, comprises:
estimating the measurement result according to the current state information of the terminal.

7. The measurement reporting method according to claim 1, wherein, prior to triggering the measurement reporting in a case that the terminal satisfies the preset measurement reporting event, the method further comprises:
receiving enable information transmitted by a base station, wherein the enable information is configured to instruct the terminal to enable or disable the measurement reporting related to the current state information of the terminal.

8. The measurement reporting method according to claim 1, further comprising:
starting a preset timer, allowing the terminal to perform the measurement reporting related to a current state of the terminal during a timing duration of the preset timer, prohibiting the terminal from performing the measurement reporting related to the current state of the terminal after the preset timer expires; or
starting a preset timer, prohibiting the terminal from performing the measurement reporting related to the current state of the terminal during a timing duration of the preset timer, allowing the terminal to perform the measurement reporting related to the current state of the terminal after the preset timer expires.

9. The measurement reporting method according to claim 8, wherein, prior to starting the preset timer, the method further comprises:
receiving configuration information transmitted by a base station, wherein the configuration information is configured to instruct the terminal to start the preset timer in a case that the terminal is capable of triggering the measurement reporting related to the current state of the terminal.

10. The measurement reporting method according to claim 1, further comprising:
receiving a measurement reporting mode configured by a base station, wherein different measurement reporting modes correspond to different measurement configurations.

11. A terminal, comprising:
a storage and a processor, wherein a computer program executable by the processor is stored in the storage, and in a case that the computer program is executed by the processor, the processor implements steps of the measurement reporting method according to claim 1.

12. The terminal according to claim 11, wherein, the Reference Signal Received Power threshold value stored by the terminal and/or the Reference Signal Received Quality threshold value stored by the terminal are configured by the base station for the terminal or are predefined.

13. A measurement reporting method, applied to a base station and comprising:
receiving a measurement reporting of a terminal, wherein the measurement reporting is triggered by the terminal in a case that the terminal satisfies a preset measurement reporting event, and the preset measurement reporting event is related to current state information of the terminal,
wherein the current state information of the terminal comprises a highest moving speed of the terminal
wherein the highest moving speed of the terminal is related to the type of the terminal, and is inherent information of the terminal;
wherein
the preset measurement reporting event being a measurement reporting event configured by the base station, wherein the terminal adds an offset amount corresponding to the current state information of the terminal to the measurement reporting event configured by the base station, wherein information of different states corresponds to different offset amounts.

14. The measurement reporting method according to claim 13, further comprising:
transmitting enable information to the terminal, wherein the enable information is configured to instruct the terminal to enable or disable a function of the measurement reporting related to the current state information of the terminal.

15. The measurement reporting method according to claim 13, further comprising:
transmitting configuration information to the terminal, wherein the configuration information is configured to instruct the terminal to start a preset timer in a case that the terminal is capable of triggering the measurement reporting related to the current state information of the terminal,
wherein the terminal is allowed to perform the measurement reporting related to the current state information of the terminal during a timing duration of the preset timer, the terminal is prohibited from performing the measurement reporting related to the current state information of the terminal after the preset timer expires; or,
the terminal is prohibited from performing the measurement reporting related to the current state information of the terminal during a timing duration of the preset timer; the terminal is allowed to perform the measurement reporting related to the current state information of the terminal after the preset timer expires.

16. The measurement reporting method according to claim 13, further comprising:
configuring a measurement reporting mode for the terminal, wherein different measurement reporting modes correspond to different measurement configurations.

17. A base station, comprising:
a storage and a processor, wherein a computer program executable by the processor is stored in the storage, and in a case that the computer program is executed by the processor, the processor implements steps of the measurement reporting method according to claim 13.

18. A terminal, comprising:
a measurement reporting circuit, configured to trigger a measurement reporting in a case that a preset measurement reporting event is satisfied, wherein the preset measurement reporting event is related to current state information of the terminal,
wherein the current state information of the terminal comprises a highest moving speed of the terminal
wherein the highest moving speed of the terminal is related to the type of the terminal, and is inherent information of the terminal;
wherein
the preset measurement reporting event being a measurement reporting event selected by the terminal from predefined measurement reporting events, wherein an offset amount corresponding to the current state information of the terminal is configured for the selected measurement reporting event, and information of different states corresponds to different offset amounts.

19. The terminal according to claim 18, wherein, the measurement reporting event defined by the terminal, comprises:
- a Reference Signal Received Power value of a currently measured cell being less than or equal to a Reference Signal Received Power threshold value stored by the terminal, and/or,
- a Reference Signal Received Quality value of a currently measured cell being less than or equal to a Reference Signal Received Quality threshold value stored by the terminal.

20. The terminal according to claim 19, wherein, the Reference Signal Received Power threshold value stored by the terminal and/or the Reference Signal Received Quality threshold value stored by the terminal are configured by the base station for the terminal or are predefined.

* * * * *